| United States Patent [19] | [11] Patent Number: 4,479,340 |
| Alphonse et al. | [45] Date of Patent: Oct. 30, 1984 |

[54] QUICK MANUAL LOCK FOR DISPLAY FRAMES

[75] Inventors: Everett J. Alphonse; Everett Alphonse, Sr., both of Camp Springs, Md.

[73] Assignee: John Goudie Associates, Inc., Brandywine, Md.

[21] Appl. No.: 454,096

[22] Filed: Dec. 28, 1982

[51] Int. Cl.³ .............................................. E04H 12/18
[52] U.S. Cl. ....................................... 52/646; 52/109; 248/165
[58] Field of Search ......................... 52/645, 109, 646; 248/165, 166, 167, 432, 431; 74/521; 182/69, 141

[56] References Cited

U.S. PATENT DOCUMENTS 4,276,726  7/1981  Derus ..................................... 52/109

*Primary Examiner*—John E. Murtagh
*Assistant Examiner*—Kathryn Ford
*Attorney, Agent, or Firm*—Cushman, Darby & Cushman

[57] ABSTRACT

A display frame is formed by a number of collapsible, articulated structural sections movable between a stable erect configuration and a collapsed configuration. Four pairs of scissored links are connected to exterior pivots at their ends to form the exterior of each structural section, and the interior is formed by a pair of face pivots and four pairs of crossed, but unconnected, face links, each pivotally connected at one end to a face pivot. A through-extending opening is provided in one face pivot, and a locking component is associated with the other face pivot. One of the structural sections of the frame has as the locking component a cam follower member which during movement of the face pivots towards each other is cammed by a linear cam associated with the through-extending opening, and then snaps to lock in place.

20 Claims, 8 Drawing Figures

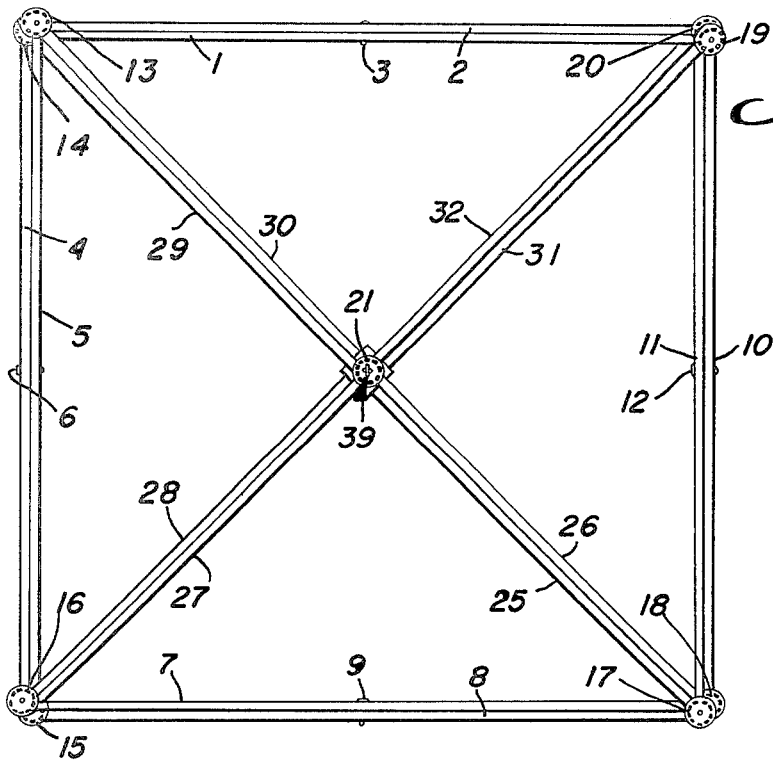
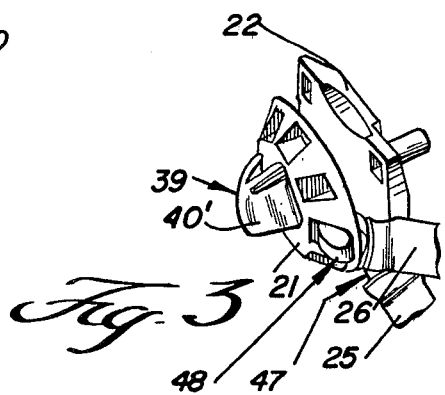
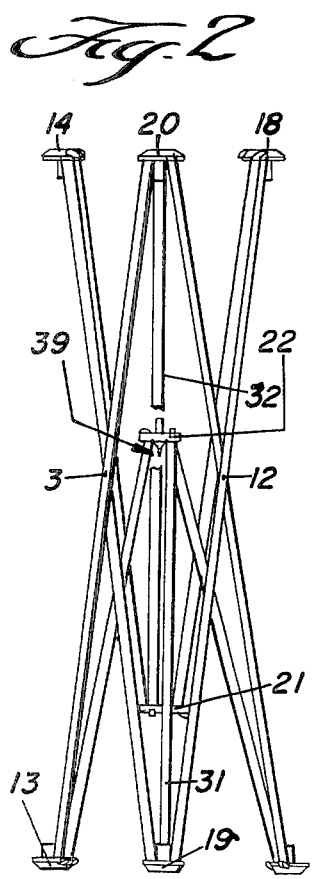
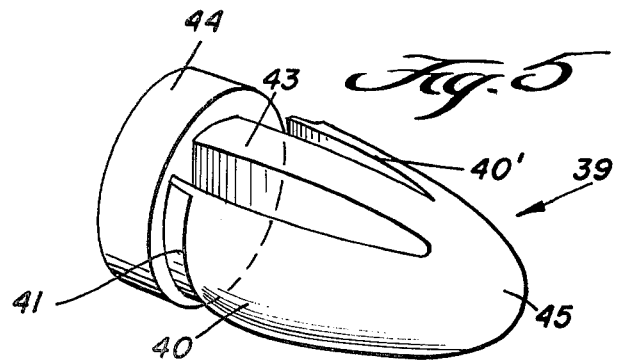
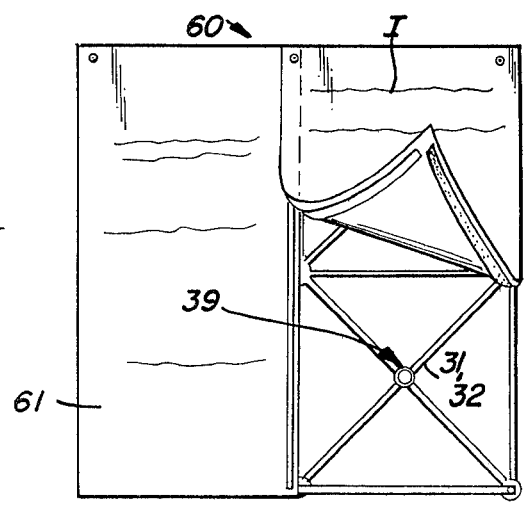

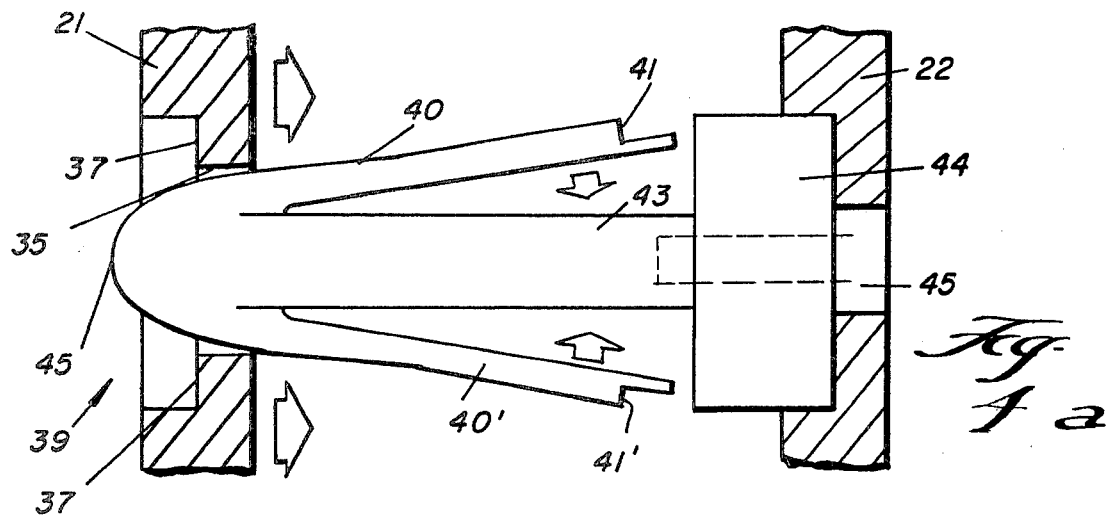
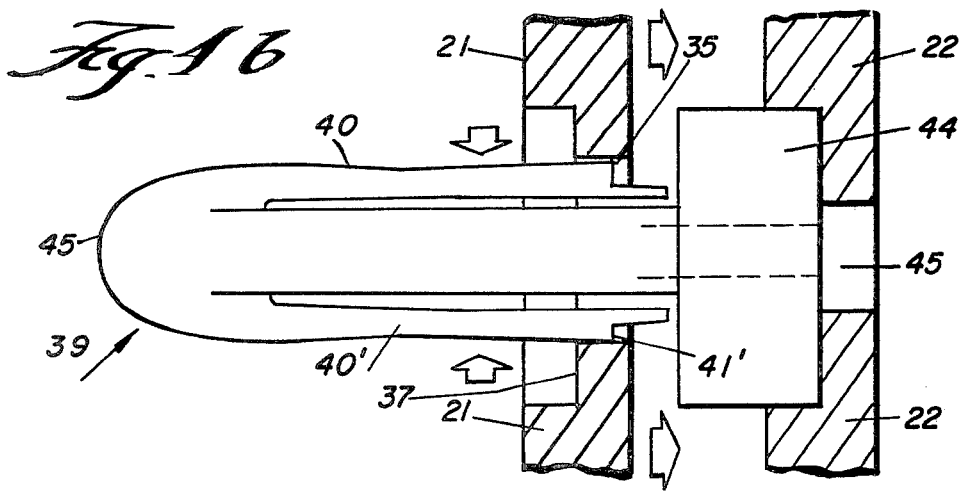
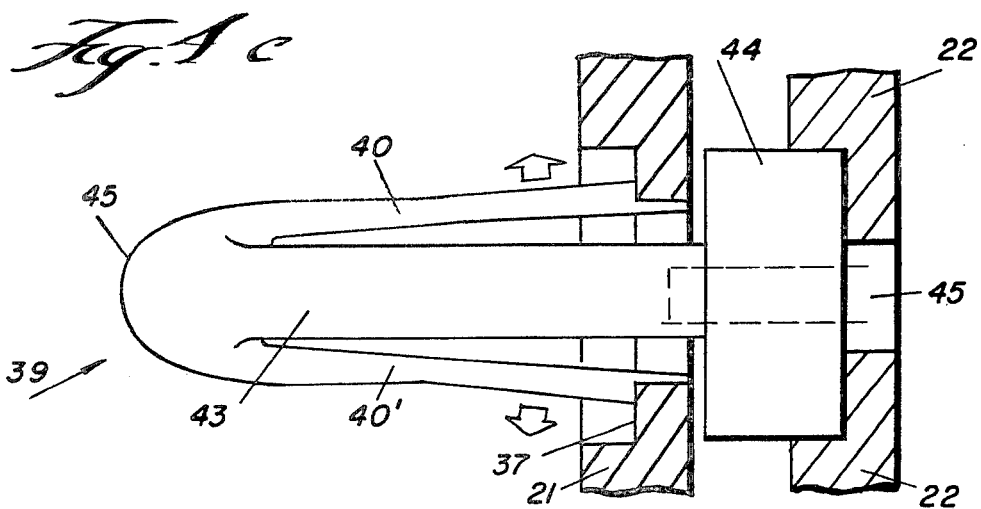

QUICK MANUAL LOCK FOR DISPLAY FRAMES

BACKGROUND AND SUMMARY OF THE INVENTION

There are a number of collapsible, articulated frames on the market today, comprised of individual sections connected together, the frame—and each section thereof—movable between a collapsed configuration and a stable erect self-locking configuration. A typical such frame is shown in U.S. Pat. No. 4,276,726. While such frames are very functional, in order to support relatively heavy graphics, or other articles, rather than merely conventional thin Lexan graphic panels (or the like), it is desirable to use accessory brace rods, or like structures, which—after erection of the frame—are added to the structure to hold it in place.

According to the present invention, a collapsible, articulated structural section—and display frame formed by a plurality of such sections—is provided which does not require separate accessory brace rods, or the like, yet provides stability that is comparable to that provided when such accessory rods are used. This is accomplished according to the present invention by providing—instead of a self-locking action, which is present in prior art portable exhibit frames—a manually actuated locking component which positively prevents collapse of the lock. The manual locking component according to the present invention is particularly utilizable with one structural section of a display frame, with the rest of the structural sections of the display frame having the particular configuration illustrated in co-pending application Ser. No. 430,006 filed Sept. 30, 1982 (the disclosure of which is hereby incorporated by reference herein).

Utilizing the invention, it is possible to move the display frame from the collapsed to an erect configuration quickly, and the particular locking means according to the present invention holds the frame in the erect configuration until all of the rest of the manual locks associated therewith are activated. The manual locks increase set-up time only a small amount compared to conventional self-locking frames, and do not really increase set-up time at all compared to conventional frames when accessory brace rods, and the like are used, while eliminating the need for carrying the accessory brace rods around, making sure that they are detached before collapse, etc.

According to the present invention a first plurality of pivot means are disposed to be spaced from each other and generally in a first plane in the erect configuration, and to be substantially adjacent each other in the collapsed configuration. A second plurality of pivot means are also disposed to be spaced from each other and generally in a second plane in the erect configuration and to be substantially adjacent each other in the collapsed configuration. A plurality of pivotally interconnected side links are provided for connecting the first plurality of pivot means with the second plurality of pivot means, each of the side links being connected with one of the first plurality of pivot means and one of the second plurality of pivot means. First and second face pivot means are provided, and a first and a second plurality of face links, each of the first plurality of face links connected with the first face pivot means and with one of the first pivot means, and each of the second plurality of face links connected with the second face pivot means and one of the second pivot means.

Each of the first plurality of face links crosses, but is unconnected to, one of the second plurality of face links (the first face pivot means is located closer to the second pivot means than it is to the first pivot means when the section is in the collapsed configuration). A first locking component is associated with the first pivot means and a second locking component is associated with the second pivot means, the first and second locking components comprising means for holding the first and second face pivot means adjacent each other and to thereby hold the structural section in its stable erect configuration. The first locking component comprises means defining a through-extending opening, including a linear cam, in the first face pivot means. The second locking component comprises a cam follower component extending outwardly from the second face pivot means toward the first face pivot means, and having a flexible portion associated therewith. The flexible portion is flexed by the linear cam until it moves to a position where it snaps into place with a locking surface associated therewith, cooperating with the locking surface of the first face pivot means to hold the structure in place. Preferably two flexible cam follower components are provided. To collapse the structure it is merely necessary to manually depress the flexible components so that the locking portions are moved out of interengagement with each other.

A structural section is usually provided in combination with a plurality of substantially identical structural sections, with adjacent structural sections sharing some common first and second pivot means, and a common pair of side links, to provide a complete and portable display frame. Graphics are preferably attached to the display frame in the manner illustrated in co-pending application Ser. No. 311,771 filed Oct. 15, 1981 (the disclosure of which is hereby incorporated by reference herein).

It is the primary object of the present invention to provide a simple, yet stable, structural section, and lockable display frame constructed from such a structural section. This and other objects of the invention will become clear from an inspection of the detailed description of the invention, and from the appended claims.

BRIEF DESCRIPTION OF THE DRAWINGS

FIG. 1 is a front view of an exemplary structural section according to the present invention when the section is in its stable erect configuration;

FIG. 2 is a side view of the section of FIG. 1 when in a collapsed configuration;

FIG. 3 is a perspective detail view showing the interrelationship the face pivot means and face links, when the section is in its stable erect configuration;

FIGS. 4a through 4c are schematic detail side views, partly in cross-section and partly in elevation, showing the cooperation between the first and second face pivot means locking components according to the present invention, at various stages during a procedure wherein they are moved into locking engagement with each other;

FIG. 5 is a perspective view of the exemplary second locking component of the structural section of FIGS. 1 through 4; and FIG. 6 is a front view of an exemplary display frame constructed according to the present invention.

DETAILED DESCRIPTION OF THE DRAWINGS

The exemplary collapsible, articulated structural section shown in the drawings is movable between the stable erect configuration of FIG. 1 and the collapsed configuration of FIG. 2. For the exemplary embodiment illustrated, eight pivotally interconnected side links 1, 2, 4, 5, 7, 8, and 10, 11 are provided. The links preferably are of aluminum tubing, and are pivotally connected together by riveted pivot pins 3, 6, 9, and 12, respectively. Preferably the side links are pivotally connected at the centers thereof so that the erected section has front and rear truly flat faces. However, if it is desired that the section assume a curvature (and a frame, constructed from a plurality of such sections have such a curvature), the pivot pins 3, 9 will be located off-center.

The structural section illustrated in the drawings also includes a first plurality of pivot means 14, 15, 18, and 20 spaced from each other and generally in a first plane in the erect configuration (FIG. 1), and substantially adjacent each other in the collapsed configuration (FIG. 2). A second plurality of pivot means 13, 16, 17, and 19 also are disposed to be spaced from each other and generally in a second plane in the erect configuration (FIG. 1) and to be substantially adjacent other in the collapsed configuration (FIG. 2).

First and second face pivot means 21, 22 are provided. Also there are provided a first plurality of face links 26, 27, 29, and 32, each of the first plurality of face links connected at one end thereof with the first face pivot means 21 (see FIGS. 3 and 4), and pivotally connected at the other end thereof with a respective first pivot means (i.e., face link 26 is pivotally connected to both first face pivot means 21 and first pivot means 18). A second plurality of face links 25, 28, 30, and 32 are provided, each pivotally connected at one end thereof with the second face pivot means 22, and at the opposite end thereof with a respective one of the second pivot means (i.e., face link 25 is connected to second face pivot means 22 and second pivot means 17).

The face links 25–32—like the side links—preferably are formed of aluminum tubing. The first and second face pivot means 21, 22 and the first and second pivot means 13 through 20 are preferably all formed of injection molded plastic.

The disposition of the first and second plurality of face links is such that each of the first plurality of face links crosses, but is unconnected to, one of the second plurality of face links. This is illustrated most clearly in FIG. 3, wherein one of the first plurality of face links 26 crosses one of the second plurality of face links 25, however there is no pivotal—or other—connection therebetween. In fact in normal use there will not even be any tangential surface-to-surface engagement thereof, although there may be some incidental tangential contact at some point during movement of the face links between the collapsed and erect configurations. As illustrated in FIG. 2, the first face pivot means 21 is located closer to the second pivot means 13, 16, 17 than it is to the first pivot means 14, 15, 18, 20 in the collapsed configuration.

Since the first and second plurality of face links 25–32 are unconnected, the structural section heretofore described will not maintain itself in a stable erect configuration. In order to maintain the section in the stable erect configuration manually actuated locking means are provided comprising a first locking component associated with the first face pivot means 21, and a second locking component associated with the second face pivot means 22. The first and second locking components comprise means for holding the first and second fact pivot means 21, 22 adjacent each other (see FIG. 3) and to thereby hold the structural section in its stable erect configuration (FIG. 1).

A number of manually actuated locking components are described in said co-pending application Ser. No. 430,006 filed Sept. 30, 1982. The locking components according to the present invention differ from the components described in said application in that they may be more easily moved into locking engagement to initially support an entire frame, with which they are associated, in an erect configuration. However the locking components according to the present invention do not ordinarily provide as positive a locking engagement as the locking components described in said application, therefore it is desirable to provide the locking components according to the invention in only one of the plurality of structural sections comprising a complete display frame, while the rest of the sections have the locking components described in said application.

The first face pivot means 21 (as seen most clearly in FIGS. 4a through 4c) includes a through-extending opening, the surface of which forms a linear cam 35. A cut out is formed in the first face pivot means 21 which defines a first locking surface 37, adjacent the opening linear cam 35.

The second locking component includes a cam follower component 39 which extends outwardly from the second face pivot means 22 toward the first face pivot means 21. The component 39 includes at least one flexible component for cooperation with the linear cam 35, and preferably two flexible components, 40, 40'. A locking surface 41, 41' is formed on the free end of each of the flexible components 40, 40'. The component 39 is preferably formed by a central relatively rigid shaft 43 connected to a base 44 and having an arcuate leading end 45 (to facilitate introduction of the component 39 into the opening defined by linear cam 35). The base 44 is connected to the second face pivot means 22 in any suitable manner, such as by removable fastener 45.

The component 39 may be formed of a wide variety of materials, but preferably is formed of an integral piece of thermoplastic material, such as nylon, polypropylene, polyethylene, etc. In this way the cantilever construction of the flexible components 40, 40' will impart to them the desired flexibility. Since the base 44 is connected to the second face pivot means 22 by the removable fastener 45, the component 39 may be readily replaced.

FIGS. 4a through 4c show the sequence of cooperation between the first and second locking components during movement of the structural section from a collapsed to an erect configuration. As shown in FIG. 4a, at first the arcuate leading end 45 of the component 39 penetrates the opening defined by 35. Then as the components 21, 22 are moved toward each other by the operator, the members 40, 40' are cammed toward each other by the linear cam surface 35. Finally at one point in the movement of the face pivot means 21, 22 toward each other the locking surfaces 41, 41' completely pass through the opening defined by 35 and then flex back outwardly (FIG. 4c), engaging the locking surface 37 and preventing withdrawal of the component 39 from the opening defined by 35.

To collapse the structural section, it is merely necessary for the operator to take his/her fingers and move the members 40, 40' toward each other so that the locking surfaces 41, 41', 37 move out of interengagement, and then start the collapsing action by moving the face pivot means 21, 22 away from each other.

In order to minimize or eliminate any engagement whatsoever between the first plurality of face links 26, 27, 29, 32 and the second plurality of face links 25, 28, 30 and 31, the second plurality of face links are mounted to the second pivot means 22 at a position more radially outward from the common center line of the face pivot means 21, 22 than the point of pivotal attachment of the respective first face link to the first face pivot means. That is, with respect to FIG. 3, the pivotal connection 47 of the second face link 25 to the second face pivot means 22 is more radially outward from the common center line of the face pivot means 21, 22 than is the point of pivotal connection 48 of the second face link 26 to the second face pivot means 21. One desirable effect that this mounting contributes to is to assist in automatically moving the second locking component out of the opening defined by 35 (e.g., to the position illustrated in FIG. 4) once the members 40, 40' are compressed (i.e. in the position illustrated in FIG. 4b during collapse). The face pivot means 21, 22 can have any desired configuration, for instance they can both be quadrate in plan.

An exemplary display frame constructed according to the present invention is shown generally by reference numeral 60 in FIG. 6. The exemplary display frame illustrated therein includes four structural sections, adjacent ones having common first and second pivot means and a common pair of side links. Only two of the sections can be seen in FIG. 6 since the others are covered by a graphic panel 61, such as described in co-pending application Ser. No. 311,771 filed Oct. 15, 1981. The structural sections of the display frame 60 are identical except that only one of the structural sections utilizes the particular locking components (i.e. opening defined by cam 35 and cam follower component 39) according to the present invention. The other sections preferably utilize the different type of manual locking components illustrated and described in said co-pending application Ser. No. 430,006 filed Sept. 30, 1982. In this way the display frame 60 can be quickly moved to the erect configuration and temporarily held in place until all of the manual locking components are activated, providing the desired enhanced strength. During the collapsing operation, the rest of the manual locking components are deactivated and then the cam follower component 39 is compressed as described above, so that final collapse takes place.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A collapsible, articulated structural section which is movable between a stable erect configuration and a collapsed configuration, said structure comprising:

a first plurality of pivot means disposed to be spaced from each other and generally in a first plane in said erect configuration, and to be substantially adjacent each other in said collapsed configuration; a second plurality of pivot means disposed to be spaced from each other and generally in a second plane in said erect configuration and to be substantially adjacent each other in said collapsed configuration; a plurality of pivotally interconnected side links for connecting said first plurality of pivot means with said second plurality of pivot means, each of said side links being connected with one of said first plurality of pivot means and one of said second plurality of pivot means; first and second face pivot means; and a first and a second plurality of face links, each of said first plurality of face links pivotally connected with said first face pivot means and with one of said first pivot means, and each of said second plurality of face links pivotally connected with said second face pivot means and with one of said second pivot means;

each of said first plurality of face links crossing, but unconnected to one of said second plurality of face links; said first face pivot means being located closer to said second pivot means than it is to said first pivot means when said structural section is in a said collapsed configuration; and a first locking component associated with said first face pivot means, and a second locking component associated with said second face pivot means, said first and second locking components comprising means, upon manual actuation, for holding said first and second face pivot means adjacent each other and to thereby hold said structural section in said stable erect configuration; and wherein said first locking component comprises means defining a through-extending opening in said first face pivot means, including a linear cam; and wherein said second locking component comprises a cam follower extending outwardly from said second face pivot means toward said first face pivot means and having a cam portion thereof cooperating with said linear cam to flex and move from a non-locking position to a locking position.

2. A structural section as recited in claim 1 wherein said first locking component includes a first locking surface adjacent said through-extending opening, and wherein said cam follower includes a second locking surface on a free end thereof, said second locking surface cooperating with said first locking surface once said second locking surface is moved past said linear cam.

3. A structural section as recited in claim 2 wherein said cam follower comprises a central relatively rigid shaft portion, and a pair of flexible cam follower portions, each cam follower portion having a second locking portion formed thereon.

4. A structural section as recited in claim 3 wherein said cam follower shaft has a leading portion that is arcuate.

5. A structural section as recited in claim 1 wherein there are four first pivot means, four second pivot means, eight side links, four first face links, and four second face links.

6. A structural section as recited in claim 5, in combination with a plurality of substantially identical structural sections, adjacent structural sections sharing some common first and second pivot means, and a common pair of side links.

7. A structural section as recited in claim 4 wherein there are four first pivot means, four second pivot means, eight side links, four first face links, and four second face links.

8. A structural section as recited in claim 7, in combination with a plurality of substantially identical structural sections, adjacent structural sections sharing some common first and second pivot means, and a common pair of side links.

9. A structural section as recited in claim 1 wherein said first and second face pivot means are concentric, and wherein said second plurality of face links are pivotally connected to said second face pivot means at points thereon further radially outwardly from said concentric center than the points of pivotal connection of said first plurality of face links to said first pivot means, so that during movement of said structural section between said erect and said collapsed configurations there is minimal, or no, frictional engagement between said first and second pluralities of face links.

10. A section as recited in claim 9 wherein said side links and said first and second plurality of face links are formed of aluminum tubing.

11. A section as recited in claim 5 wherein said side links and said first and second plurality of face links are formed of aluminum tubing.

12. A structural section as recited in claim 3 wherein said first and second face pivot means are concentric, and wherein said second plurality of face links are pivotally connected to said second face pivot means at points thereon further radially outwardly from said concentric center than the points of pivotal connection of said first plurality of face links to said first pivot means, so that during movement of said structural section between said erect and said collapsed configurations there is minimal, or no, frictional engagement between said first and second pluralities of face links.

13. A section as recited in claim 1 wherein said side links and said first and second plurality of face links are formed of aluminum tubing.

14. A display frame formed by a plurality of interconnected structural sections, each structural section comprising:
a first plurality of pivot means disposed to be spaced from each other and generally in a first plane in said erect configuration, and to be substantially adjacent each other in said collapsed configuration; a second plurality of pivot means disposed to be spaced from each other and generally in a second plane in said erect configuration and to be substantially adjacent each other in said collapsed configuration; a plurality of pivotally interconnected side links for connecting said first plurality of pivot means with said second plurality of pivot means, each of said side links being connected with one of said first plurality of pivot means and one of said second plurality of pivot means; first and second face pivot means; and a first and a second plurality of face links, each of said first plurality of face links pivotally connected with said first face pivot means and with one of said first pivot means, and each of said second plurality of face links pivotally connected with said second face pivot means and with one of said second pivot means;
each of said first plurality of face links crossing, but unconnected to one of said second plurality of face links; said first face pivot means being located closer to said second pivot means than it is to said first pivot means when said structural section is in said collapsed configuration; and
a first locking component associated with said first face pivot means, and a second locking component associated with said second face pivot means, said first and second locking components comprising means, upon manual actuation, for holding said first and second face pivot means adjacent each other and to thereby hold said structural section in said stable erect configuration; and
wherein the first and second locking components of one of said structural sections comprise: means defining a through-extending opening in said first face pivot means, including a linear cam; and wherein said second locking component comprises a cam follower extending outwardly from said second face pivot means toward said first face pivot means and having a cam portion thereof cooperation with said linear cam to flex and move from a non-locking position to a locking position.

15. A display frame as recited in claim 14 wherein the rest of said sections besides said one section are constructed so that: said first locking component comprises means defining a through-extending opening in said first face pivot means, and wherein said second locking component comprises a central shaft extending from said second face pivot means towards said first face pivot means and having a free end on a portion thereof remote from said second face pivot means, said free end including a shaft terminating portion dimensioned to fit in said first face pivot means opening, and a rotatable locking member on the end of said shaft terminating portion, said rotatable locking member mounted to said shaft by means providing rotation thereof from a first position in-line with said shaft end termination so that it can pass through said first face pivot means opening, to a second position not in-line with said shaft end termination so that said locking member engages said first face pivot means on an opposite end thereof from said second face pivot means.

16. A display frame as recited in claim 15 wherein for each of said sections said side links and said first and second plurality of face links are formed of aluminum tubing.

17. A display frame as recited in claim 15 wherein for each structural section there are four first pivot means, four second pivot means, eight side links, four first face links, and four second face links; and wherein adjacent structural sections share some common first and second pivot means, and a common pair of side links.

18. A display frame are recited in claim 14 wherein for each structural section there are four first pivot means, four second pivot means, eight side links, four first face links, and four second face links; and wherein adjacent structural sections share some common first and second pivot means, and a common pair of side links.

19. A display frame as recited in claim 14 wherein for each of said sections said side links and said first and second plurality of face links are formed of aluminum tubing.

20. A structural section as recited in claim 1 wherein said second locking component is anchored to said second face pivot means by a removable fastener.

* * * * *